United States Patent
Yageta

(10) Patent No.: US 12,545,389 B2
(45) Date of Patent: Feb. 10, 2026

(54) ELECTRIC POWERED OUTBOARD MOTOR

(71) Applicant: HONDA MOTOR CO., LTD., Tokyo (JP)

(72) Inventor: Tomoaki Yageta, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 474 days.

(21) Appl. No.: 18/159,377

(22) Filed: Jan. 25, 2023

(65) Prior Publication Data

US 2023/0242229 A1 Aug. 3, 2023

(30) Foreign Application Priority Data

Jan. 28, 2022 (JP) .................. 2022-011530

(51) Int. Cl.
   *B63H 21/17* (2006.01)
   *B63H 20/20* (2006.01)
   *B63H 21/21* (2006.01)

(52) U.S. Cl.
   CPC ............. *B63H 21/17* (2013.01); *B63H 20/20* (2013.01); *B63H 21/213* (2013.01); *B63H 2021/216* (2013.01)

(58) Field of Classification Search
   CPC .................. B63H 21/17; B63H 21/213; B63H 2021/216; B63H 20/20
   See application file for complete search history.

(56) References Cited

U.S. PATENT DOCUMENTS

| | | | | |
|---|---|---|---|---|
| 2009/0215337 A1* | 8/2009 | Suzuki | ................. | B63H 21/213 440/86 |
| 2009/0215338 A1* | 8/2009 | Suzuki | ................. | B63H 21/213 440/86 |
| 2016/0003172 A1* | 1/2016 | Yamaguchi | ......... | F02D 41/0225 701/102 |

FOREIGN PATENT DOCUMENTS

| | | |
|---|---|---|
| JP | 2014080077 A | 5/2014 |
| JP | 2014172518 A | 9/2014 |

* cited by examiner

*Primary Examiner* — Stephen P Avila
(74) *Attorney, Agent, or Firm* — Armstrong Teasdale LLP

(57) ABSTRACT

An electric outboard motor 1 includes an operating part 33 that is switchable between forward and reverse rotation positions; a control device 35 configured to switch, based on the position of the operating part, a drive state of an electric motor 8 between forward, reverse, and neutral states. When the position of the operating part is switched from the forward rotation position to the reverse rotation position (ST1 Yes) while a watercraft is moving (ST2: Yes), the control device causes the drive state to transition from the forward rotation state to the reverse rotation state (ST3) such that, before completion of the transition, the drive state is held to be the neutral state for a predetermined time period (ST4).

14 Claims, 4 Drawing Sheets

ELECTRIC POWERED OUTBOARD MOTOR

TECHNICAL FIELD

The present invention relates to an outboard motor for watercraft equipped with an electric motor as a power source.

BACKGROUND ART

To this date, internal combustion engines have been used in many outboard motors for watercraft as a power source. In recent years, vehicle exhaust gas regulations for motor vehicles such as automobiles have been enforced worldwide in order to reduce the adverse impact of exhaust gas emission on the global environment. In this context, outboard motors powered by electric motors, which do not generate exhaust gas, are attracting more attention. In the case of electric-powered outboard motors, switching between the forward and reverse rotations of a propeller is achieved by switching the rotation direction of an electric motor. Thus, unlike outboard motors using internal combustion engines, an electric-powered outboard motor is not provided with a gear shifting mechanism (reversing mechanism), but with a power transmission mechanism that connects an electric motor with a propeller without a shifting mechanism.

An example of such technologies is an electric-powered outboard motor for watercraft in which an outboard motor body includes an electric motor provided in its upper part and a propeller provided in the lower part, wherein the electric motor generates a driving force that rotates the propeller (Patent Document 1). This electric-powered outboard motor includes a control unit configured such that the electric motor operating in regeneration mode functions as a generator driven by the rotation of the propeller for generating electric power, which is used to charge a battery via an inverter. The control unit includes an operation controller configured to control the inverter, thereby controlling the operation of the electric motor, based on signals from a throttle grip and a shift switch provided on a steering wheel of the watercraft. The shift switch is provided separately from the throttle grip and used to switch the rotation direction of the electric motor between the forward and reverse rotations.

An example of such technologies is an electric-powered outboard motor for watercraft in which an accelerator grip is attached to a steering handle of a watercraft and rotatable in forward and reverse directions around the axis of the steering handle, wherein the accelerator grip is an operating member used to change the rotation direction and adjust the rotation speed of an electric motor (Patent Document 2) The electric-powered outboard motor further includes a shift sensor and an accelerator sensor for detecting the direction and amount of rotation of the accelerator grip, respectively. The electric-powered outboard motor also includes a control unit configured to drive and control the electric motor depending on the direction and amount of rotation of the accelerator grip.

PRIOR ART DOCUMENT(S)

Patent Document(s)

Patent Document 1: JP2014-080077A
Patent Document 2: JP2014-172518A

SUMMARY OF THE INVENTION

Task to be Accomplished by the Invention

However, the electric-powered outboard motors disclosed in D1 and D2 are designed without considering cases where the rotation direction of an electric motor is switched (reversed) by an operation (that is, a switching operation on a shift switch or a direction changing operation on an accelerator grip) while the watercraft is moving. For example, in some cases, while the watercraft is moving forward, a user operates the shift switch to change the rotation direction of the electric motor from a forward rotation direction to a reverse rotation direction in order to make a sudden stop of the watercraft, thereby avoiding collision with an obstacle. In this case, a sudden change in the rotation direction (drive state) of the electric motor from the forward rotation direction (forward rotation state) to the reverse rotation direction (reverse rotation state) can cause a large force to act on a propeller and a power transmission mechanism connecting the propeller and the electric motor, causing damage to these mechanical parts.

The present invention has been made in view of the above-described problem of the prior art, and a primary object of the present invention is to provide an electric-powered outboard motor for watercraft (herein also written as simply "electric outboard motor") configured to reduce damage to mechanical parts of a watercraft that can occur when the rotation direction of an electric motor is switched (reversed) by an operation on an operating part while the watercraft is moving.

Means to Accomplish the Task

An aspect of the present invention provides an electric outboard motor (1) for a watercraft comprising: an electric motor (8); a propeller (12) coupled to the electric motor via a power transmission mechanism (9, 10, 11); an operating part (33) configured to enable a user to switch a position of the operating part between a forward rotation position and a reverse rotation position; a control device (35) configured to, in response to an operation on the operating part, switch a drive state of the electric motor to a forward rotation state in which the electric motor rotates in a forward rotation direction, a reverse rotation state in which the electric motor rotates in a reverse rotation direction, and a neutral state in which the electric motor is not driven, wherein the control device controls the drive state of the electric motor based on the position of the operating part such that the drive state is set to be the forward rotation state or the reverse rotation state by the forward rotation position or the reverse rotation position, respectively; and wherein, when the position of the operating part is switched from the forward rotation position to the reverse rotation position (ST1: Yes) while the watercraft is moving (ST2: Yes), the control device causes the drive state of the electric motor to transition from the forward rotation state to the reverse rotation state such that, during and before completion of the transition from the forward rotation state to the reverse rotation state (ST3), the control device holds the drive state to be the neutral state for a predetermined time period (ST4).

According to this configuration, when the operating part is operated to switch its position from the forward rotation position to the reverse rotation position while the watercraft is moving, the drive state of an electric motor does not immediately transition from the forward rotation state to the reverse rotation state, but during and before completion of the transition, the drive state is held to be the neutral state for a predetermined time period. As a result, when the rotation direction of the electric motor is switched (reversed), a less force acts on the power transmission mechanism and the propeller, resulting in a reduction in damage to such mechanical parts.

The above outboard motor may be further configured such that the electric outboard motor further comprises a watercraft speed acquiring device (27) for acquiring a watercraft speed, wherein the control device (35) changes the predetermined time period, for which the drive state is held to be the neutral state, depending on the watercraft speed acquired by the watercraft speed acquiring device when the drive state is the neutral state.

When the drive state is the reverse rotation state, the higher the speed of a watercraft is, the larger a force acting on the power transmission mechanism and the propeller is. This configuration enables the predetermined time period, for which the drive state is held to be the neutral state, to be changed depending on the speed of a watercraft, thereby making a further reduction in damage to a power transmission mechanism and a propeller.

The above outboard motor may be further configured such that the electric outboard motor further comprises a torque sensor (26) for acquiring a torque applied to the power transmission mechanism (9, 10, 11), wherein the control device (35) changes the predetermined time period, for which the drive state is held to be the neutral state, depending on the torque applied to the power transmission mechanism when the drive state is the neutral state.

When the drive state is the reverse rotation state, the larger the torque applied to a power transmission mechanism is, the more likely the power transmission mechanism and a propeller are damaged. This configuration enables the predetermined time period, for which the drive state is held in the neutral state, to be changed depending on the torque, thereby making a further reduction in damage to the power transmission mechanism and a propeller.

The above outboard motor may be further configured such that the electric outboard motor further comprises a watercraft speed acquiring device (27) for acquiring a watercraft speed; and a torque sensor (26) for acquiring a torque applied to the power transmission mechanism, wherein the control device causes the drive state to transition from the neutral state to the reverse rotation state (ST3) after the torque acquired by the torque sensor becomes equal to or less than a predetermined torque (ST7: Yes) and the watercraft speed acquired by the watercraft speed acquiring device becomes equal to or less than a predetermined speed (ST8).

In this configuration, a force acting on the power transmission mechanism and the propeller when the drive state is changed to the opposite rotation state, can be adjusted to be equal to or less than a level corresponding to a predetermined speed, and this adjustment of the acting force can make a further reduction in damage to the power transmission mechanism and the propeller, and prevent a sudden drop in the speed of the watercraft.

The above outboard motor may be further configured such that the forward rotation direction and the reverse rotation direction of the electric motor correspond to forward movement and backward movement of the watercraft, respectively.

In this configuration, when, during the forward movement of the watercraft, the operating part is operated to switch the drive state of the electric motor to the reverse rotation state, a less force acts on the power transmission mechanism and the propeller, resulting in a reduction in damage to such mechanical parts.

The above outboard motor may be further configured such that, when the position of the operating part (33) is switched from the reverse rotation position to the forward rotation position (ST1: Yes) while the watercraft is moving, the control device (35) causes the drive state to transition from the reverse rotation state to the forward rotation state (ST3) such that, during and before completion of the transition, the control device holds the drive state to be the neutral state for the predetermined time period (ST4).

In this configuration, when, during the backward movement of the watercraft, the operating part is operated so as to switch the rotation direction of the electric motor, thereby changing the drive state to the forward rotation state, a less force acts on the power transmission mechanism and the propeller, resulting in a reduction in damage to such mechanical parts.

The above outboard motor may be further configured such that, when the drive state is the neutral state, the control device (35) causes terminals of the electric motor to be short-circuited.

In this configuration, when the drive state is the neutral state, the rotational resistance of the propeller becomes larger and thus a watercraft which is being propelled by inertia receives more resistance from the water, resulting in a quick decrease in the speed of the watercraft.

The above outboard motor may be further configured such that, when the drive state is the neutral state, the control device (35) causes terminals of the electric motor to be open-circuited.

In this configuration, when the drive state is the neutral state, a force caused by the propulsion of the watercraft and acting on the propeller is less likely to damage the propeller and the power transmission mechanism.

The above outboard motor may be further configured such that, when the drive state is the neutral state, the control device (35) switches a state of terminals of the electric motor between a first state in which the terminals are short-circuited and a second state in which the terminals are open-circuited.

This configuration can achieve both a reduction in damage to the propeller and the power transmission mechanism and a quick decrease in the speed of the watercraft.

Effect of the Invention

As described above, the present invention can provide an electric outboard motor configured to reduce damage to mechanical parts of a watercraft that can occur when the rotation direction of an electric motor is switched (reversed) by an operation on an operating part while the watercraft is moving.

DESCRIPTION OF THE PREFERRED EMBODIMENT(S)

Embodiments of an electric outboard motor of the present invention are described in the following with reference to the appended drawings. Direction-indicating terms as used herein refer to their corresponding directions (such as front/rear and up/down) that are determined by directions for a watercraft body 2 to which the electric outboard motor is attached.

Figure 1:
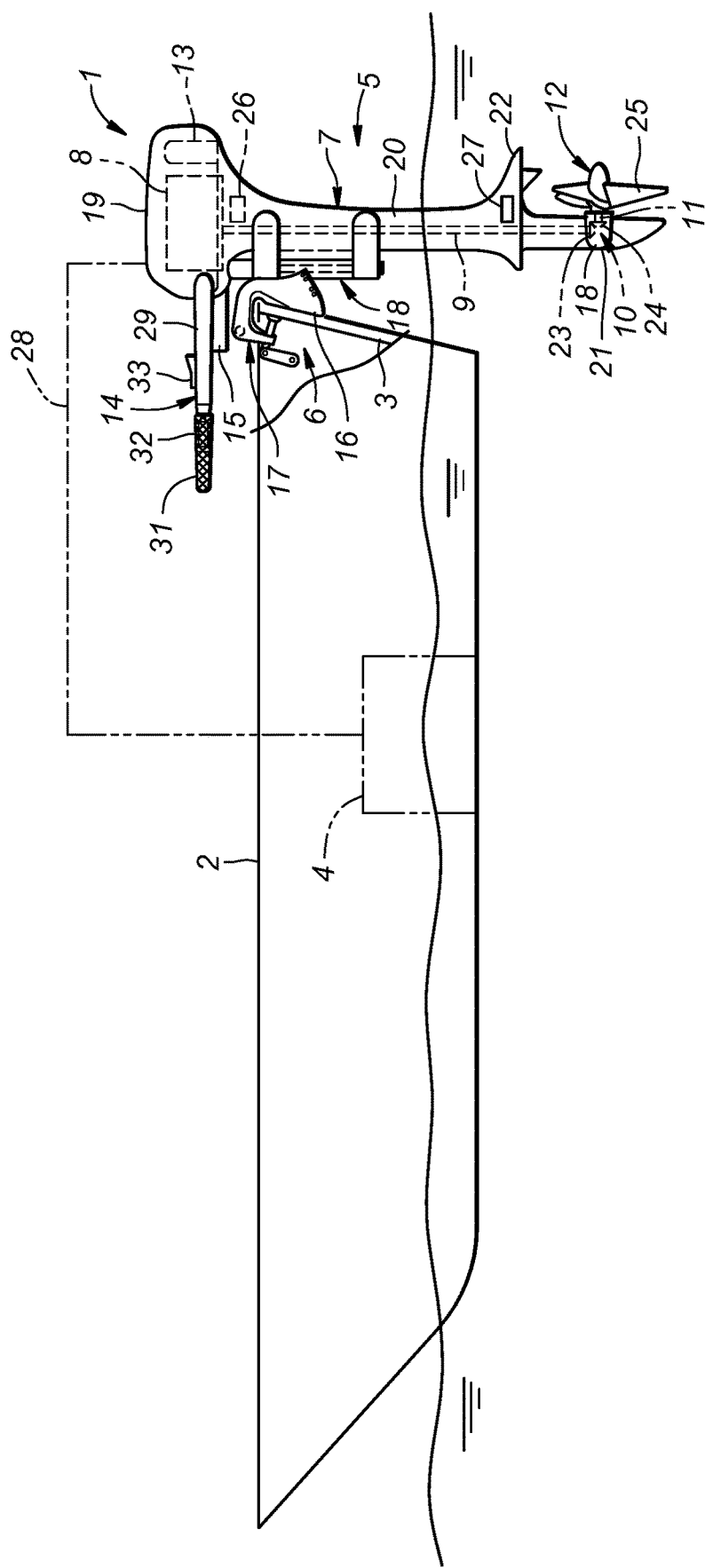
FIG. 1 is a side view of a watercraft equipped with an electric outboard motor according to an embodiment of the present invention.

FIG. 1 is a side view of a watercraft equipped with an electric outboard motor 1. As shown in FIG. 1, the electric outboard motor 1 is detachably attached to a rear part of a watercraft body (hull) 2, specifically to a board of the transom 3 of the watercraft body so as to enable propulsion of the watercraft body 2 according to the operation of a user (operator). The electric outboard motor 1 is driven by power supplied from a battery 4 mounted on the watercraft body 2.

The electric outboard motor 1 comprises an outboard motor body 5 and an attachment device 6 for attaching the outboard motor body 5 to the watercraft body 2. The outboard motor body 5 includes a body housing 7, an electric motor 8, a drive shaft 9, a gear unit 10, a propeller shaft 11, a propeller 12, a control unit 13, an input device 14, and a handle 15. The attachment device 6 includes a clamp bracket 16, a tilt mechanism 17 and a swivel mechanism 18. Details of these elements of the electric outboard motor 1 will be described below.

The body housing 7 is made of a metal material or hard plastic material and configured to have a predetermined rigidity. The body housing 7 includes an upper housing portion 19 provided on the upper side thereof and a lower housing portion 20 provided below the upper housing portion 19. The upper housing portion 19 and the lower housing portion 20 may be made of the same material or different respective materials. The upper housing portion 19 has a hollow shape that is generally flat with a smaller dimension in the vertical direction and elongated in the front-rear direction. The upper housing portion 19 houses the electric motor 8 and the control unit 13. The lower housing portion 20 has a hollow shape that is vertically elongated. The lower housing portion 20 houses the drive shaft 9 and the gear unit 10.

The lower housing portion 20 includes a gear housing 21 for accommodating the gear unit 10 and an anti-ventilation plate 22. The gear housing 21 is integrally provided at a lower part of the lower housing portion 20, and the anti-ventilation plate 22 is integrally provided above the gear housing 21. The gear housing 21 has a cannonball shape that bulges laterally with respect to the lower housing portion 20 and is elongated in the front-rear direction. The anti-ventilation plate 22 has a horizontally extending plate shape and extends out rearward so as to cover the propeller 12 from above.

The electric motor 8 is a power source for rotating the propeller 12, and one example of the electric motor is a permanent magnet synchronous motor. The type of the electric motor 8 is not limited to this, i.e., any type of electric motor may be used. The electric motor 8 is arranged in a front part of the upper housing portion 19 so that its output shaft extends vertically downward. The electric motor 8 is formed to have a flat shape that horizontally extends when being mounted in the upper housing portion 19, with a horizontal dimension larger than its vertical dimension (height).

The drive shaft 9 extends vertically below the electric motor 8. The upper end of drive shaft 9 is connected to the output shaft of the electric motor 8. A drive gear 23 is integrally provided at the lower end of the drive shaft 9, and is comprised primarily of a first bevel gear. The drive shaft 9 is rotatably supported in the lower housing portion 20 by a pair of bearings (i.e., upper and lower bearings).

The propeller shaft 11 extends in the front-rear direction (horizontal direction) below the drive shaft 9; that is, the axial direction of the propeller shaft 11 is the longitudinal direction. A front portion of the propeller shaft 11 is housed in the gear housing 21 and rotatably supported by a pair of bearings (i.e., front and rear bearings) in the gear housing 21. A driven gear 24 is integrally provided at the front end of the propeller shaft 11, and comprised primarily of a second bevel gear that meshes with the drive gear 23. The propeller shaft 11 extends through a support hole of the gear housing 21 and extends out rearward from the gear housing 21 to be exposed to the outside of the body housing 7.

The gear unit 10 includes the drive gear 23 at the lower end of the drive shaft 9 and the driven gear 24 at the front end of the propeller shaft 11. Rotation of the drive shaft 9 is transmitted to the propeller shaft 11 via the gear unit 10.

The propeller 12 is fixed to the outer periphery of a rear portion of the propeller shaft 11. The propeller 12 is located behind the rear end of the gear housing 21 and exposed to the outside of the body housing 7. The propeller 12 has a plurality of fins 25 that radially protrude from an outer peripheral surface of the propeller 12.

The outboard motor body 5 is provided with a torque sensor 26 for detecting torque T applied to the drive shaft 9. The torque sensor 26 detects torque T output by the electric motor 8 when the electric motor 8 is driven. When the electric motor 8 is not driven while the watercraft is on a run; that is, the watercraft body 2 is moving ahead at a speed with respect to the water, the torque sensor 26 detects torque T transmitted from the propeller 12 to the electric motor 8. The torque sensor 26 may be comprised primarily of a current sensor for detecting the current flowing through the electric motor 8. A watercraft speed sensor 27 is provided at the lower part of the lower housing portion 20, which is submerged in water, and is configured to detect the speed of water flow; that is, a watercraft speed V (the speed of the watercraft body 2 relative to the water). In some cases, the watercraft speed sensor 27 may be provided on the watercraft body 2.

The control unit 13 is connected via a cable 28 to a battery 4 provided on the watercraft body 2. The control unit 13 is also connected to the input device 14. The control unit 13 supplies power to the electric motor 8 and controls the operation of the propeller 12 based on operation signals transmitted from the input device 14 and sensor signals from the torque sensor 26 and the watercraft speed sensor 27.

The input device 14 is a device(s) for receiving user's input operations, and is provided integrally with the upper housing portion 19 of the outboard motor body 5. In the present embodiment, the input device 14 includes a tiller handle 30, a throttle grip 31, a throttle sensor 32 and a shift switch 33 provided on the tiller handle 30. The tiller handle 30 is provided on the upper housing portion 19 so as to be rotatable about a lateral axis; that is, an axis in the left-right direction. The tiller handle 30 is provided such that, during use of the electric outboard motor, the tiller handle 30 protrudes frontward, and when the electric outboard motor is in storage, the tiller handle 30 is pivotably inverted to extend along the upper housing portion 19.

The throttle grip 31 is an operating member used to change the output (rotational speed and torque T) of the electric motor 8. The throttle grip 31 is rotatably provided at the free end of the tiller handle 30 such that the throttle grip 31 is rotatable around the axis of the tiller handle 30 between a closed position and a fully open position. A biasing member is provided to constantly urge the throttle grip 31 toward the closed position. The throttle sensor 32 is configured to detect the amount of operation of the throttle grip 31 (the amount of rotation from the closed position), and transmit signals to the control unit 13.

The shift switch 33 is an operating member comprised primarily of a switch for switching the rotation direction of the electric motor 8 between forward rotation (forward rotation direction) and reverse rotation (reverse rotation direction). The shift switch 33 is provided on the upper surface of the tiller handle 30 such that the shift switch 33 is movable (switchable) between a forward rotation position and a reverse rotation position. The forward rotation position is a position in which a watercraft is driven to move forward, and the reverse rotation position is a position in which a watercraft is driven to move backward. The shift switch 33 is configured to transmit signals indicating these positions to the control unit 13.

Figure 2:
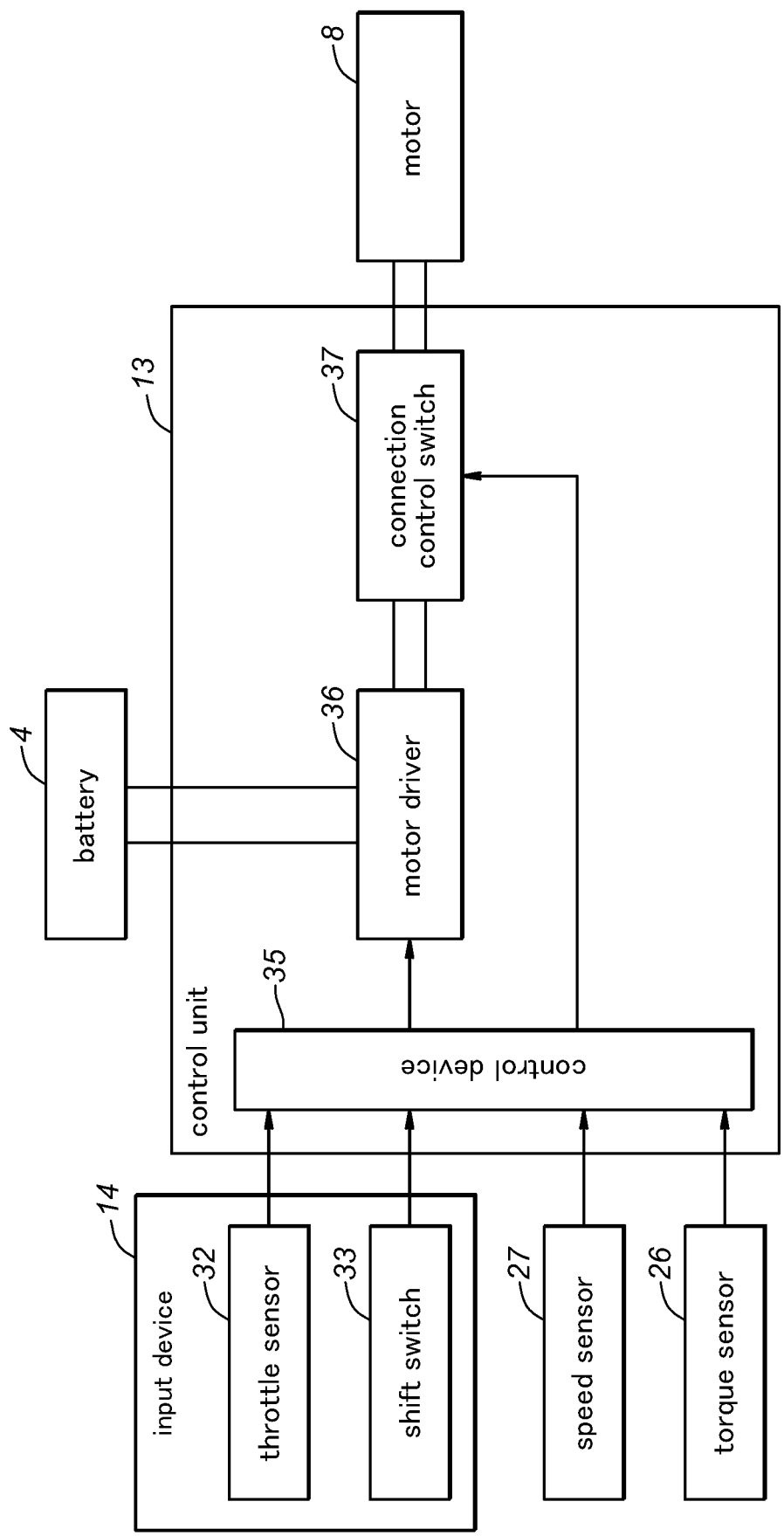
FIG. 2 is a functional block diagram of the electric outboard motor shown in FIG. 1.

FIG. 2 is a functional block diagram of the electric outboard motor 1 shown in FIG. 1. As shown in FIG. 2, the control unit 13 includes a control device 35, a motor driver 36, and a connection control switch 37.

The control device 35 is an electronic control unit (ECU) including a CPU, a nonvolatile memory (ROM), a volatile memory (RAM), and other components. Through the CPU's execution of processing instructions according to software programs, the control device 35 controls the motor driver 36 and the connection control switch 37, thereby controlling the operation of the electric motor 8. The control device 35 may be configured as one piece of hardware, or a unit formed by a plurality of pieces of hardware.

The motor driver 36, which includes an inverter and a voltage controller, is configured to switch the energization direction with a transition speed determined based on the rotation speed of the electric motor 8, and to control the voltage by on-and-off switching operation according to a PWM signal. A change in the voltage applied from the motor driver 36 changes the current flowing through the electric motor 8, which leads to a change in the output (power) of the electric motor 8.

The connection control switch 37 is configured to switch the direction of current flowing through the electric motor 8 between one direction for forward rotation (forward current direction) and the other for reverse rotation (reverse current direction) to thereby switch the rotation direction of the electric motor 8 between the forward rotation direction and the reverse rotation direction. When the current flows in the forward current direction, the propeller 12 rotates in one direction for forward movement of a watercraft (forward moving direction). When the current flows in the reverse current direction, the propeller 12 rotates in the other direction for backward movement of a watercraft (backward moving direction). In other words, the forward rotation direction and the reverse rotation direction of the electric motor 8 correspond to forward movement and backward movement of the watercraft, respectively. When the control device 35 controls the connection control switch 37 so that the current flows in the forward current direction, the drive state of the electric motor 8 becomes a forward rotation state in which the electric motor rotates in the forward rotation direction. When the control device 35 controls the connection control switch 37 so that the current flows in the forward current direction, the drive state of the electric motor 8 becomes a reverse rotation state in which the electric motor rotates in the reverse rotation direction.

When the throttle grip 31 is rotated while the connection control switch 37 is in the forward rotation position, the control device 35 controls the motor driver 36 to rotate the electric motor 8 in the forward rotation direction with a power corresponding to the amount of rotation of the throttle grip 31. When the throttle grip 31 is rotated while the connection control switch 37 is in the reverse rotation position, the control device 35 controls the motor driver 36 to rotate the electric motor 8 in the reverse direction with a power corresponding to the amount of rotation.

When the throttle grip 31 is not rotated, the control device 35 does not drive the electric motor 8 to rotate. In this case, the electric motor 8 is not driven regardless of the position of the connection control switch 37, which means that the drive state of the electric motor 8 is a neutral state in which the electric motor 8 is not driven.

Figure 3:
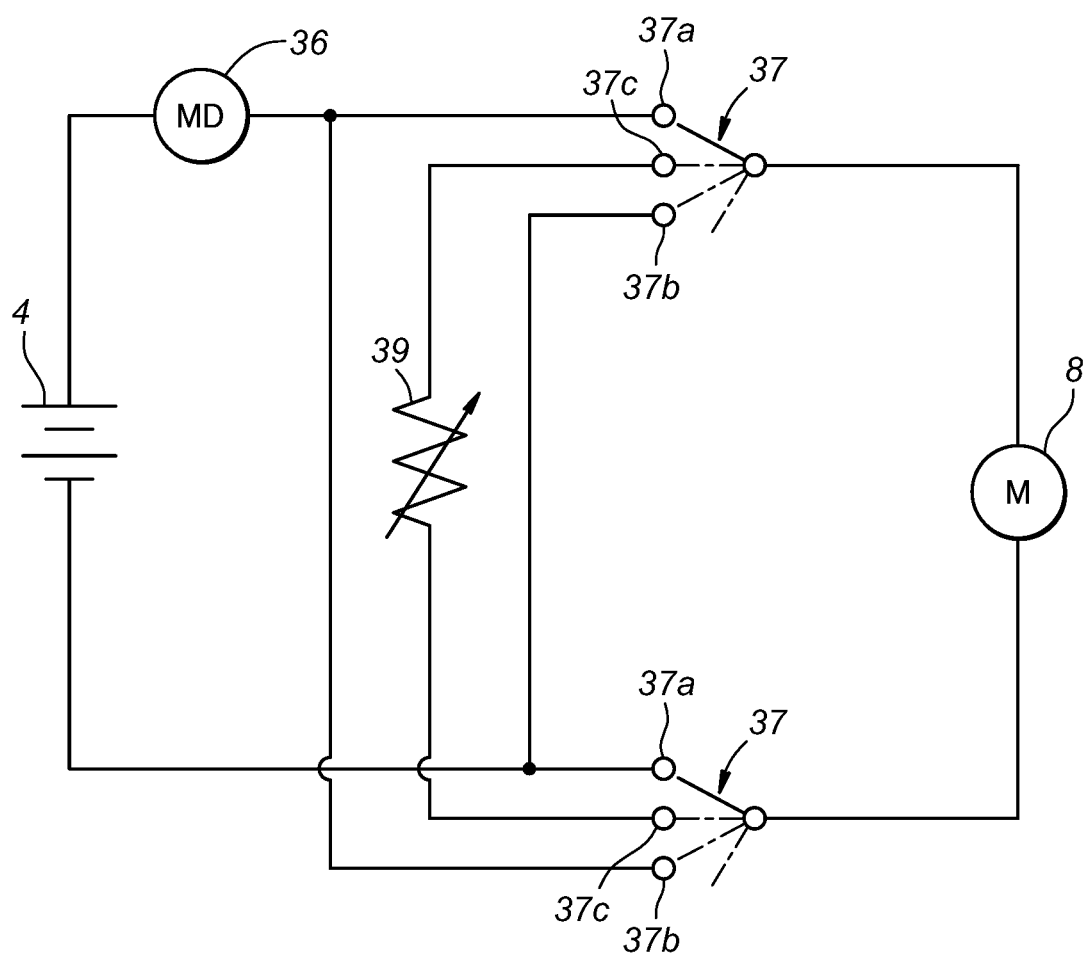
FIG. 3 is a circuit diagram of the electric outboard motor shown in FIG. 1.

FIG. 3 is a circuit diagram of the electric outboard motor shown in FIG. 1. As shown in FIG. 3, the connection control switch 37 includes forward terminals 37a for applying the current to the electric motor 8 in the forward current direction, and reverse terminals 37b for applying the current to the electric motor 8 in the reverse current direction. The connection control switch 37 further includes short-circuit terminals 37c for short-circuiting two terminals of the electric motor 8. When the connection control switch 37 connects the terminals of the electric motor 8 to the short-circuit terminals 37c, the electric motor 8 is not driven. This means that, when the connection control switch 37 short-circuits the terminals of the electric motor 8, the drive state of the electric motor 8 is also the neutral state in which the electric motor 8 is not driven. A variable resistor 39, which is controlled by the control device 35, is provided in the circuit that short-circuits the terminals of the electric motor 8.

There are cases where the rotation direction of the electric motor 8 is switched by an operation (a switching operation on the shift switch 33) while a watercraft is moving. Although details will be described later, during and before completion of the change of the rotation direction, the drive state transitions to a state in which the connection control switch 37 connects the terminals of the electric motor 8 to the short-circuit terminals 37c (one of the neutral states). In this state, the watercraft continues to move by inertial force, resulting in that the propeller 12 generates torque T, and the generated torque T is transmitted to the electric motor 8 and rotates the rotor of the electric motor 8. When the rotor is rotated while the terminals of the electric motor 8 are short-circuited, the rotational resistance of the propeller 12 becomes larger. As a result, the watercraft, which is propelled by inertial force, receives more resistance from the water, resulting in a quick decrease in the speed of the watercraft. In addition, by controlling the resistance of the variable resistor 39, the control device 35 can change the rotational resistance of the propeller 12 to thereby adjust the resistance that the watercraft received from the water.

Furthermore, the connection control switch 37 is capable of taking a position in which the terminals of the electric motor 8 are not connected to any of the forward terminals 37a, the reverse terminals 37b, and the short-circuit terminals 37c; that is, the terminals of the electric motor 8 are open-circuited. When the connection control switch 37 open-circuits the terminals of the electric motor 8, the drive state of the electric motor 8 is also the neutral state in which the electric motor 8 is not driven.

When the connection control switch 37 open-circuits the terminals of the electric motor 8 while the watercraft is moving (the other neutral state), the rotor of the electric motor 8 rotates due to the torque T generated by the propeller 12. In this case, since the terminals of the electric motor 8 are open-circuited, the propeller 12 can rotate with a small rotational resistance. As a result, a force applied to the propeller 12 due to movement of the watercraft by inertial force is prevented from damaging the power transmission mechanism and the propeller 12.

Moreover, when setting the drive state of the electric motor 8 to be a neutral state, the control device 35 may first short-circuit the terminals of the electric motor 8 until the watercraft speed V is adequately decreased, and then open-circuit the terminals of the electric motor 8. In this way, the control device 35 can switch the connection control switch 37 during the transition of the drive state of the electric motor 8 to the neutral state to thereby achieve both a quick decrease in the watercraft speed V and a reduction in damage to the propeller 12 and the power transmission mechanism.

Figure 4:
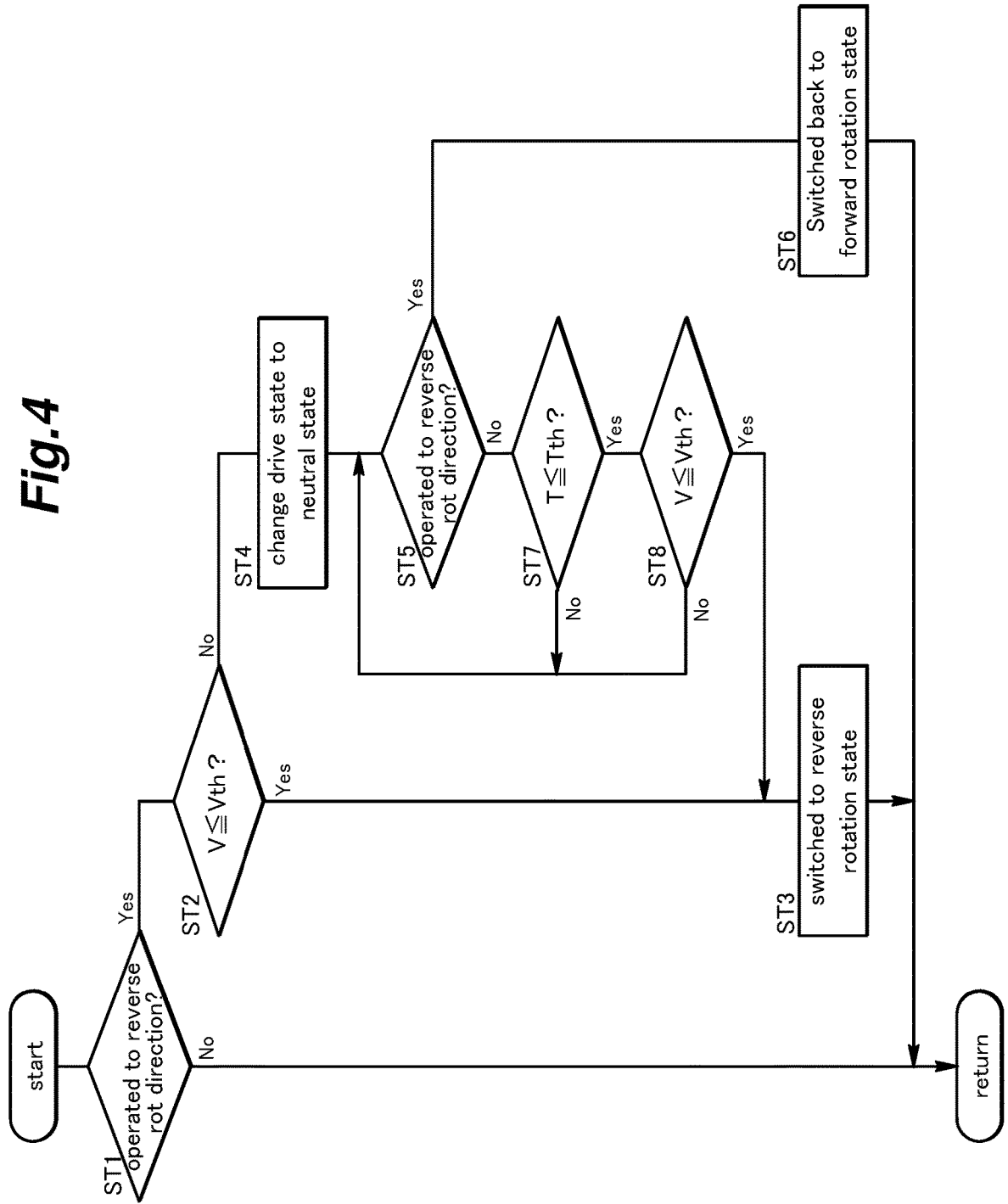
FIG. 4 is a flow chart of operations performed by a control device for control of the drive state of an electric motor.

Next, operations performed by the control device 35 for control of the drive state will be described. FIG. 4 is a flow chart of operations performed by the control device 35 for control of the drive state of the electric motor 8.

The control device 35 repeatedly executes the following operations in a predetermined cycle. First, the control device 35 determines whether or not the shift switch 33 is operated to switch (reverse) the rotation direction; that is, whether or not a switching operation is performed on the shift switch (step ST1). This switching operation is either an operation for moving the shift switch 33 from the forward rotation position to the reverse rotation position, or an operation for moving the shift switch 33 from the reverse rotation position to the forward rotation position. When there is no switching operation (step ST1: No), the control device 35 ends the routine.

When there is a switching operation (step ST1: Yes), the control device 35 determines whether or not the watercraft speed V is equal to or lower than a predetermined speed Vth that is a predetermined threshold value (step ST2). The speed of a watercraft can be represented by a positive value for the forward movement of the watercraft and a negative value for the backward movement. However, in the present embodiment, a watercraft speed V is defined as an absolute value, and the predetermined speed Vth is a threshold value common to the both cases of the forward and backward movements. In other embodiments, two threshold values having different absolute values may be used for positive and negative values of the watercraft speed V, respectively.

When the watercraft speed V is equal to or less than the predetermined speed Vth in step ST2 (Yes), the control device 35 changed the drive state of the electric motor 8 from the original rotation state to the opposite rotation state; that is, the rotation direction determined in ST1 is reversed (step ST3), and ends the routine. In other words, when the drive state of the electric motor 8 before the change is the forward rotation state, the control device 35 switches the drive state to the reverse rotation state, whereas, when the drive state of the electric motor 8 before the change is the reverse rotation state, the control device 35 switches the drive state to the forward rotation state.

When the watercraft speed V exceeds the predetermined speed Vth in step ST2 (No), the control device 35 switches the drive state of the electric motor 8 to the neutral state (step ST4). Then, the control device 35 determines whether or not there is another switching operation (step ST5). When there is another switching operation (step ST5: Yes), the control device 35 further switches the drive state of the electric motor 8 to the opposite rotation state; that is, the rotation state before the first change determined in step ST1 (step ST6), and ends the routine.

When there is no switching operation in step ST5 (step ST5: No), the control device 35 determines whether or not a torque T applied to the drive shaft 9 is equal to or less than a predetermined torque Tth (step ST7). A torque T can be represented by both a positive value and a negative value. However, in the present embodiment, a torque T is defined as an absolute value, and the predetermined torque Tth is a threshold value common to the both cases of the both positive values and negative values of the torque T. In other embodiments, two threshold values having different absolute values may be used for positive and negative values of the torque T, respectively.

When the torque T is less than or equal to the predetermined torque Tth (step ST7: Yes), the control device 35 determines whether or not the watercraft speed V is less than or equal to a predetermined speed Vth (step ST8). This predetermined speed Vth used as a threshold value may be the same value as or a different value from the predetermined speed Vth used in step ST2. The larger the absolute value of watercraft speed V determined in step ST2 is, the longer the time required until the torque T becomes equal to or less than the predetermined torque Tth (step ST7: Yes).

When the torque T exceeds the predetermined torque Tth (step ST7: No), the control device 35 returns the process to step ST5. In the case of a torque T for Yes in step ST7, when the watercraft speed V exceeds the predetermined speed Vth (step ST8: No), the control device 35 returns the process to step ST5. When the watercraft speed V is equal to or less than the predetermined speed Vth (step ST8: Yes), the control device 35 switches the drive state of the electric motor 8 to the opposite rotation state before change in step ST1 (step ST3), and ends the routine. Specifically, when the drive state of the electric motor 8 is the forward rotation state in step 1, the control device 35 switches the drive state to the reverse rotation state. When the drive state of the electric motor 8 is the reverse rotation state in step 1, the control device 35 switches the drive state to the forward rotation state. Generally, the larger the absolute value of a watercraft speed V determined in step ST2 is, the longer the time required until the watercraft speed V becomes equal to or less than the predetermined speed Vth (step ST8: Yes).

In particular, when the shift switch 33 is switched from the forward rotation position to the reverse rotation position while a watercraft is moving (ST1: Yes), the control device 35 changes the drive state of the electric motor 8 to the neutral state and holds the neural state for a predetermined time period (ST4) before completion of the transition to the reverse rotation state (ST3). In other words, the drive state of an electric motor 8 does not immediately transition from the forward rotation state to the reverse rotation state, but the drive state is, during and before completion of the transition, held to be the neutral state for the predetermined time period. As a result, when the rotation direction of the electric motor 8 is switched (reversed) in step ST3, a less force acts on the gear unit 10 and the propeller 12, resulting in a reduction in damage to such mechanical parts.

When the drive state of the electric motor 8 is changed to the reverse rotation state in step ST3, the higher the watercraft speed V is, the larger a force acting on the gear unit 10 and the propeller 12 is. In the present embodiment, the control device 35 switches the drive state of the electric motor 8 such that the predetermined time period, for which the drive state is held in the neutral state, is changed depending on the watercraft speed V. Specifically, when the shift switch 33 is switched from the forward rotation position to the reverse rotation position in step ST1, the higher the watercraft speed V determined in step ST2 is, the longer the predetermined time period. This variation of the predetermined time period can make a further reduction in damage to the gear unit 10 and the propeller 12.

When the drive state of the electric motor 8 is changed to the reverse rotation state in step ST3, the larger the torque T applied to the gear unit 10 is, the more likely the gear unit 10 and the propeller 12 are damaged. In the present embodiment, the control device 35 switches the drive state of the electric motor 8 such that the predetermined time period, for which the drive state is held in the neutral state, is changed depending on the torque applied to the gear unit 10. Specifically, when the shift switch 33 is switched from the forward rotation position to the reverse rotation position in step ST1, the larger the torque T determined in step ST7 is, the longer the predetermined time period. This variation of the predetermined time period can make a further reduction in damage to the gear unit 10 and the propeller 12.

Furthermore, the control device 35 causes the drive state of the electric motor 8 to transition from the neutral state to the opposite rotation state after the torque T becomes equal to or less than the predetermined torque Tth in step ST7 (Yes) and the watercraft speed V becomes equal to or less than the predetermined speed Vth in step ST8 (Yes). These conditions for changing the drive state enable the adjustment of a force acting on the gear unit 10 and the propeller 12 that occurs when the drive state of the electric motor 8 is changed to the opposite rotation state in step ST3, such that the acting force is adjusted to be equal to or less than a level corresponding to the predetermined speed Vth. This adjustment of the acting force can make a further reduction in damage to the gear unit 10 and the propeller 12, and prevent a sudden drop in the watercraft speed V.

As described above, the forward rotation direction and the reverse rotation direction of the electric motor 8 correspond to forward movement and backward movement of the watercraft, respectively. Thus, when the shift switch 33 is operated to change its position while the watercraft is moving forward (ST1: Yes) and the drive state of the electric motor 8 is switched from the forward rotation state to the reverse rotation state in step ST3, a less force acts on the gear unit 10 and the propeller 12, resulting in a reduction in damage to such mechanical parts.

In the present embodiment, when the shift switch 33 is switched from the reverse rotation position to the forward rotation position (ST1: Yes), the control device 35 causes the drive state of the electric motor 8 to transition from the reverse rotation state to the forward rotation state (ST3) such that, during and before completion of the transition, the control device 35 holds the drive state to be the neutral state for the predetermined time period (ST4). Thus, when the shift switch 33 is operated to change its position while the watercraft is moving backward (ST1: Yes) and the drive state of the electric motor is switched from the reverse rotation state to the forward rotation state, a less force acts on the gear unit 10 and the propeller 12, resulting in a reduction in damage to such mechanical parts.

Specific embodiments of the present disclosure are described herein for illustrative purposes. However, the present disclosure is not limited to those specific embodiments, and various modifications may be made to the embodiments without departing from the scope of the present disclosure.

For example, in the above-described embodiments, the input device 14 includes the shift switch 33. However, in some cases, the throttle grip 31 may be provided as an operating part for the switching of the drive state, eliminating the need of the shift switch 33. Specifically, the throttle grip 31 may be rotatable in both forward and backward directions from the neutral position. In this case, for example, the input device may be configured such that, when the throttle grip 31 is rotated in the reverse direction during forward movement, the drive state of the electric motor 8 does not immediately transition from the forward rotation state to the reverse rotation state, but, during and before completion of the transition, the drive state is held to be the neutral state for the predetermined time period.

Although, in the above-described embodiments, a user's operation (including a switching operation) for changing the drive state of the electric motor 8 is performed on the input device 14 (specifically, the shift switch 33 and the throttle grip 31) provided integrally with the outboard motor body 5, the configuration the input device is not limited to this. For example, the input device 14 may be separate from the outboard motor body 5 and configured to transmit operation signals to the control unit 13 in a wired or wireless manner. In this case, the input device 14 may be provided, for example, in the wheelhouse of a watercraft. In other cases, the input device 14 does not need to have an operating member such as the shift switch 33 or the throttle grip 31. For example, the input device 14 may be configured by a smartphone or tablet, and an operating part may be provided as one or more operation sections shown in a touch screen that can be operated by a user. In this case, a touch input to an operation section (forward rotation button or switching button) for switching the drive state to the forward rotation state is equivalent to a switching operation on the input device for switching the drive state to the forward rotation position, whereas a touch input to an operation section (reverse rotation button or switching button) for switching the drive state to the reverse rotation state is equivalent to a switching operation on the input device for switching the drive state to the reverse rotation position.

In the above-described embodiments, the control device 35 causes the drive state of the electric motor 8 to transition from the neutral state to the reverse rotation state after the torque T becomes equal to or less than the predetermined torque Tth in step ST7 (Yes) and the watercraft speed V becomes equal to or less than the predetermined speed Vth in step ST8 (Yes). In other embodiments, the control device 35 may refer to a map or other data to determine the predetermined time period, for which the drive state is held to be the neutral state. For example, the control device 35 may determine the predetermined time period depending on at least one of the watercraft speed V determined in step ST2 and the torque T determined in step ST7. In this case, the predetermined time period is preferably changed to be longer with the increase in the watercraft speed V and with the increase in the torque T.

In the above-described embodiments, the watercraft speed V is defined as the speed of the watercraft body 2 with respect to the water. However, the watercraft speed V may be the speed of a watercraft acquired from position data. In this case, a GPS device is used as a watercraft speed acquiring device for acquiring the watercraft speed V. Generally, various changes and modifications may be made for features of the embodiments such as specific configuration, location, quantity, material and mounting angle of each component or element in the embodiments without departing from the scope of the present disclosure. In the above-described embodiments, not all elements therein are essential. Thus, various modifications including elimination of some elements may be made to the embodiments as appropriate.

Glossary 1 electric outboard motor
2 watercraft body
4 battery
8 electric motor
9 drive shaft (power transmission mechanism)
10 gear unit (power transmission mechanism
11 propeller shaft (power transmission mechanism)
12 propeller
13 control unit
14 input device
26 torque sensor
27 watercraft speed sensor (watercraft speed acquiring device)
31 throttle grip
32 throttle sensor
33 shift switch (operating part)
35 control device
36 motor driver
37 connection control switch

The invention claimed is:

1. An electric outboard motor for a watercraft comprising:
an electric motor;
a propeller coupled to the electric motor via a power transmission mechanism;
an operating part configured to be operated by a user and having an operation position switchable between a forward rotation operation position for instructing forward rotation of the electric motor and a reverse rotation operation position for instructing reverse rotation of the electric motor;
a control device configured to, according to the operation position of the operating part, switch a drive state of the electric motor between a forward rotation state in which the electric motor rotates in a forward rotation direction, a reverse rotation state in which the electric motor rotates in a reverse rotation direction, and a neutral state in which the electric motor is not driven,
wherein the control device is configured to set the drive state to be the forward rotation state when the operation position of the operating part is at the forward rotation operation position, and set the drive state to be the reverse rotation state when the operation position of the operating part is at the reverse rotation operation position; and
wherein, when the operation position of the operating part is switched from the forward rotation operation position to the reverse rotation operation position while the watercraft is moving, the control device sets the drive state to be the neutral state for a predetermined time period, and subsequently, sets the drive state to be the reverse rotation state.

2. The electric outboard motor as in claim 1, further comprising a watercraft speed acquiring device for acquiring a speed of the watercraft,
wherein the control device changes the predetermined time period depending on the speed of the watercraft when the drive state is set to be the neutral state.

3. The electric outboard motor as in claim 1, further comprising a torque sensor for acquiring a torque applied to the power transmission mechanism,
wherein the control device changes the predetermined time period depending on the torque when the drive state is set to be the neutral state.

4. The electric outboard motor as in claim 1, further comprising:
a watercraft speed acquiring device for acquiring a speed of the watercraft; and
a torque sensor for acquiring a torque applied to the power transmission mechanism,
wherein the control device switches the drive state from the neutral state to the reverse rotation state after the torque becomes equal to or less than a predetermined torque and the speed of the watercraft becomes equal to or less than a predetermined speed.

5. The electric outboard motor as in claim 1, wherein the forward rotation direction and the reverse rotation direction of the electric motor correspond to forward movement and backward movement of the watercraft, respectively.

6. The electric outboard motor as in claim 1, wherein, when the operation position of the operating part is switched from the reverse rotation operation position to the forward rotation operation position while the watercraft is moving, the control device sets the drive state to be the neutral state for a predetermined time period, and subsequently, sets the drive state to be the forward rotation state.

7. The electric outboard motor as in claim 1, wherein, when the drive state is set to be the neutral state, the control device puts positive and negative terminals of the electric motor in a short-circuited state.

8. The electric outboard motor as in claim 1, wherein, when the drive state is set to be the neutral state, the control device puts positive and negative terminals of the electric motor in an open-circuited state.

9. The electric outboard motor as in claim 1, wherein, when the drive state is set to be the neutral state, the control device switches positive and negative terminals of the electric motor between a short-circuited state and an open-circuited state.

10. An electric outboard motor for a watercraft comprising:
an electric motor;
a propeller coupled to the electric motor via a power transmission mechanism;
an operating part configured to be operated by a user and having an operation position switchable between a forward rotation operation position for instructing forward rotation of the electric motor and a reverse rotation operation position for instructing reverse rotation of the electric motor;
a control device configured to, according to the operation position of the operating part, switch a drive state of the electric motor between a forward rotation state in which the electric motor rotates in a forward rotation direction, a reverse rotation state in which the electric motor rotates in a reverse rotation direction, and a neutral state in which the electric motor is not driven;
a watercraft speed acquiring device for acquiring a speed of watercraft; and
a torque sensor for acquiring a torque applied to the power transmission mechanism,
wherein the control device is configured to set the drive state to be the forward rotation state when the operation position of the operating part is at the forward rotation operation position, and set the drive state to be the reverse rotation state when the operation position of the operating part is at the reverse rotation operation position; and wherein, when the operation position of the operating part is switched from the forward rotation operation position to the reverse rotation operation position while the watercraft is moving, the control device switches the drive state from the neutral state to the reverse rotation state after the torque becomes equal to or less than a predetermined torque and the speed of the watercraft becomes equal to or less than a predetermined speed.

11. A method for controlling a drive state of an electric motor in an electric outboard motor for a watercraft by a processor,
wherein the electric outboard motor comprises:
an electric motor;
a propeller coupled to the electric motor via a power transmission mechanism; and
an operating part configured to be operated by a user and having an operation position switchable between a forward rotation operation position for instructing forward rotation of the electric motor and a reverse rotation operation position for instructing reverse rotation of the electric motor,
wherein the method comprises
the processor performing processing operations to:
according to the operation position of the operating part, switch a drive state of the electric motor between a forward rotation state in which the electric motor rotates in a forward rotation direction, a reverse rotation state in which the electric motor rotates in a reverse rotation direction, and a neutral state in which the electric motor is not driven;
set the drive state to be the forward rotation state when the operation position of the operating part is at the forward rotation operation position;
set the drive state to be the reverse rotation state when the operation position of the operating part is at the reverse rotation operation position; and
when the operation position of the operating part is switched from the forward rotation operation position to the reverse rotation operation position while the watercraft is moving, set the drive state to be the neutral state for a predetermined time period, and subsequently, sets the drive state to be the reverse rotation state.

12. A non-transitory computer-readable storage medium storing a program which causes a processor to control a drive state of an electric motor in an electric outboard motor for a watercraft,
wherein the electric outboard motor comprises:
an electric motor;
a propeller coupled to the electric motor via a power transmission mechanism; and
an operating part configured to be operated by a user and having an operation position switchable between a forward rotation operation position for instructing forward rotation of the electric motor and a reverse rotation operation position for instructing reverse rotation of the electric motor
wherein the program causes the processor to perform processing operations to:
according to the operation position of the operating part, switch a drive state of the electric motor between a forward rotation state in which the electric motor rotates in a forward rotation direction, a reverse rotation state in which the electric motor rotates in a reverse rotation direction, and a neutral state in which the electric motor is not driven;
set the drive state to be the forward rotation state when the operation position of the operating part is at the forward rotation operation position;
set the drive state to be the reverse rotation state when the operation position of the operating part is at the reverse rotation operation position; and
when the operation position of the operating part is switched from the forward rotation operation position to the reverse rotation operation position while the watercraft is moving, set the drive state to be the neutral state for a predetermined time period, and subsequently, set the drive state to be the reverse rotation state.

13. A method for controlling a drive state of an electric motor in an electric outboard motor for a watercraft by a processor,
wherein the electric outboard motor comprises:
an electric motor;
a propeller coupled to the electric motor via a power transmission mechanism;
an operating part configured to be operated by a user and having an operation position switchable between a forward rotation operation position for instructing forward rotation of the electric motor and a reverse rotation operation position for instructing reverse rotation of the electric motor;
a watercraft speed acquiring device for acquiring a speed of watercraft; and
a torque sensor for acquiring a torque applied to the power transmission mechanism,
wherein the method comprises
the processor performing processing operations to:
according to the operation position of the operating part, switch a drive state of the electric motor between a forward rotation state in which the electric motor rotates in a forward rotation direction, a reverse rotation state in which the electric motor rotates in a reverse rotation direction, and a neutral state in which the electric motor is not driven;
set the drive state to be the forward rotation state when the operation position of the operating part is at the forward rotation operation position;
set the drive state to be the reverse rotation state when the operation position of the operating part is at the reverse rotation operation position; and
when the operation position of the operating part is switched from the forward rotation operation position to the reverse rotation operation position while the watercraft is moving, switch the drive state from the neutral state to the reverse rotation state after the torque becomes equal to or less than a predetermined torque and the speed of the watercraft becomes equal to or less than a predetermined speed.

14. A non-transitory computer-readable storage medium storing a program which causes a processor to control a drive state of an electric motor in an electric outboard motor for a watercraft,
wherein the electric outboard motor comprises:
an electric motor;
a propeller coupled to the electric motor via a power transmission mechanism;
an operating part configured to be operated by a user and having an operation position switchable between a forward rotation operation position for instructing forward rotation of the electric motor and a reverse rotation operation position for instructing reverse rotation of the electric motor;

a watercraft speed acquiring device for acquiring a speed of watercraft; and a torque sensor for acquiring a torque applied to the power transmission mechanism, wherein the program causes the processor to perform processing operations to:

according to the operation position of the operating part, switch a drive state of the electric motor between a forward rotation state in which the electric motor rotates in a forward rotation direction, a reverse rotation state in which the electric motor rotates in a reverse rotation direction, and a neutral state in which the electric motor is not driven;

set the drive state to be the forward rotation state when the operation position of the operating part is at the forward rotation operation position;

set the drive state to be the reverse rotation state when the operation position of the operating part is at the reverse rotation operation position; and when the operation position of the operating part is switched from the forward rotation operation position to the reverse rotation operation position while the watercraft is moving, switch the drive state from the neutral state to the reverse rotation state after the torque becomes equal to or less than a predetermined torque and the speed of the watercraft becomes equal to or less than a predetermined speed.

\* \* \* \* \*